United States Patent [19]

Gausman, Jr.

[11] 4,221,999
[45] Sep. 9, 1980

[54] THREE-PHASE TWO SPEED A.C. MOTOR

[75] Inventor: Elmer J. Gausman, Jr., Tipp City, Ohio

[73] Assignee: A. O. Smith Corporation, Milwaukee, Wis.

[21] Appl. No.: 891,207

[22] Filed: Mar. 29, 1978

[51] Int. Cl.² .............................................. H02P 7/48
[52] U.S. Cl. ..................................... 318/704; 318/773
[58] Field of Search ................................ 318/704, 773

[56] References Cited

U.S. PATENT DOCUMENTS

| | | | |
|---|---|---|---|
| 3,070,734 | 12/1962 | Rawcliffe | 318/773 |
| 3,175,143 | 3/1965 | Rawcliffe | 318/773 |
| 3,197,686 | 7/1965 | Rawcliffe et al. | 318/773 |
| 3,233,159 | 2/1966 | Rawcliffe | 318/773 |

Primary Examiner—J. V. Truhe
Assistant Examiner—Eugene S. Indyk
Attorney, Agent, or Firm—Andrus, Sceales, Starke & Sawall

[57] ABSTRACT

A three-phase motor is wound with three spaced phase windings each having first and second multiple section windings. The second winding sections of each are connected in series. The first winding has one end of all three phases connected in common. The second winding has one end connected to the common intermediate connection of the first winding sections. The outer ends of the windings are connected to a two-speed switch having two different positions for alternate direct connection of the two windings to incoming phase lines. In one position, both sections are in circuit with the three oppposite ends of the one winding connected to each other to form a second common connection. In second position, the second windings is disconnected and the first winding sections are connected in series in a star circuit, with the current flow in the two sections of each winding reversed from the first speed connection. The switch includes five separate switches, three of which have a common pole connected to a phase line and an associated high speed contact and low speed contact connected to the windings and two of which have interconnected common poles and associated contacts to the terminal ends of the second winding.

6 Claims, 3 Drawing Figures

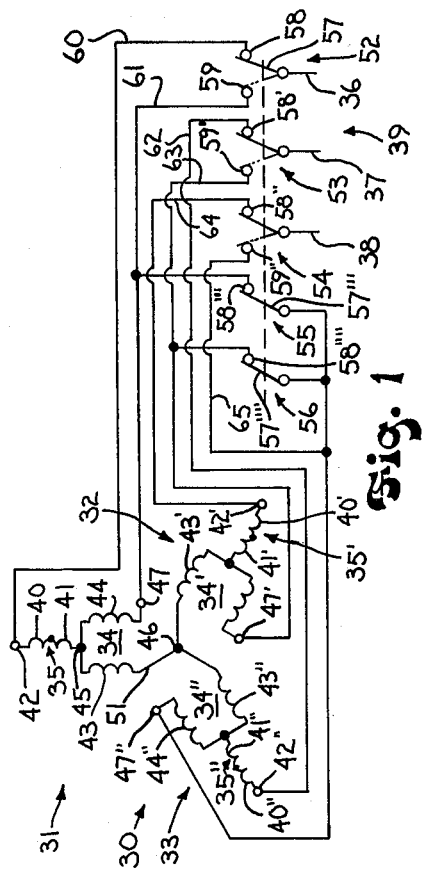
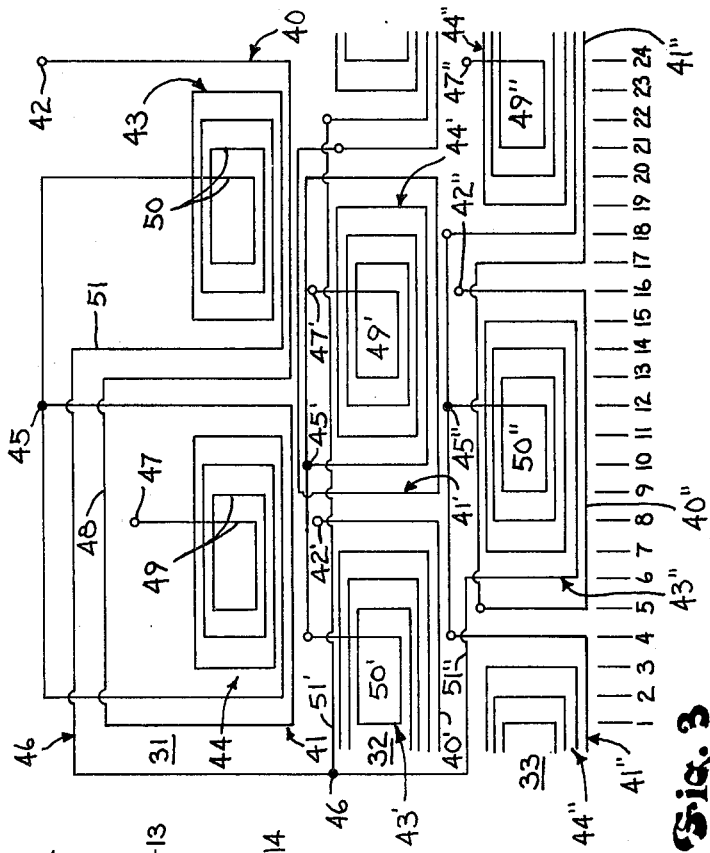
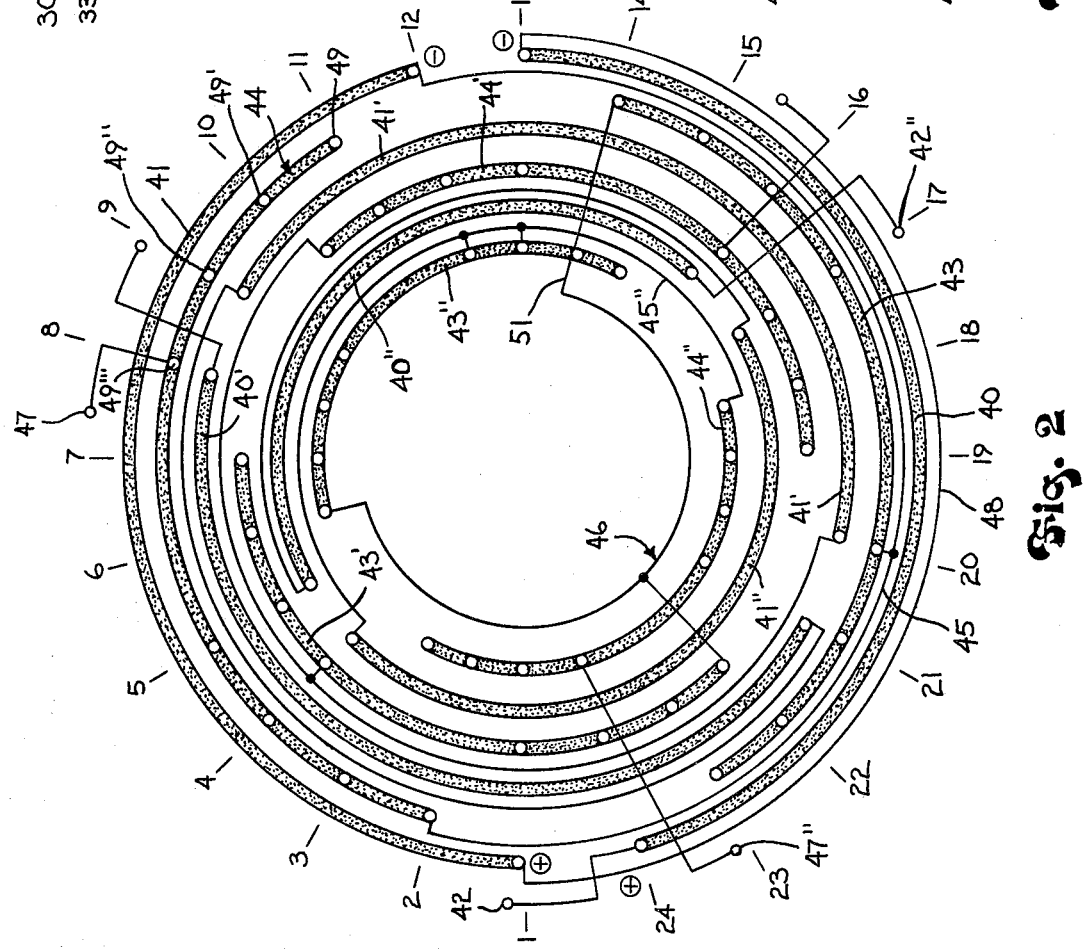

THREE-PHASE TWO SPEED A.C. MOTOR

BACKGROUND OF THE INVENTION

This invention relates to a three-phase motor having a stator winding connected to a three-phase input by a multiple speed stator winding construction.

Electric motors are often required for operating at two different speeds. Various systems have been provided for controlling the speed of the motor including the use of alternate windings, one for each speed. A single phase motor is disclosed in U.S. Pat. No. 3,359,476 in which a plurality of windings are provided in a multiple section arrangement. All of the windings used are one speed while only a part of the windings are employed but in a different connection, to provide an alternate and different speed. The dual functioning winding, however, provides a more efficient use of the winding space than motors having completely separate windings for different speeds. The system is restricted to a single phase motor. Further, a special motor starting switch arrangement is used for the motor winding connections and the system limits the starting of the motor to a single speed arrangement, with switch over means when the second speed is desired. Further, many larger motors employ a three-phase winding configuration for connection to a three-phase power supply. The prior art has employed various series-parallel winding combinations to control the power output ratio of the two speed winding arrangements. They, however, produced relatively large steps in changes in power ratios. A much smaller or finer change in steps can be provided in the system of the above patent which permits appropriate selection of a conductor slot for controlling the magnetic effects of the turns in the motor coils in one speed when compared to the other alternate speed. The multiple section winding is thus desirable because it allows the designer to more accurately distribute the turns in the slots which are most effective in each speed connection. However, the prior art systems have been limited to the various separate windings, complex series-parallel combinations and the like.

SUMMARY OF THE PRESENT INVENTION

The present invention is particularly directed to a three-phase induction motor having multiple section first and second windings interconnected in alternate circuit connections by a direct connecting switch means to permit starting and operation of the three-phase motor in two different operating speeds.

In accordance with the present invention, the three-phase motor is wound with three electrically and physically spaced phase winding assembly. Each winding assembly includes a first winding and a second winding. The first and second windings each include first and second sections, with the first and second sections of the first winding each including a plurality of coils concentrically wound in adjacent coil slots. The first and second sections of the first winding are connected in series with a first end thereof connected in common. The opposite end of the first winding is connected to the two-speed switch for direct connection to an incoming phase line in the one switch position, or alternately to connect the three opposite ends to each other to form a second common connection in the second switch position. The first and second sections of the second winding are also connected in series. The second winding has one end connected to the common intermediate connection of the first winding sections and the outer ends connected to the switch means for selective connection directly to the incoming phase lines in the first switch position. In the first switch position, the second winding is connected in circuit from the phase lines to the first winding and through the two sections of the first winding which are individually connected to form separate star connections, the first of which is provided by the fixed connection and the second of which is provided through the switch connection to the first winding. In the alternate or second speed position of the switch the second winding is disconnected from the circuit and the two sections of each first winding are connected in series as one leg of a star circuit with the current flow in the two sections of each winding reversed from the first speed connection.

In a preferred connection, a double throw speed switch unit includes five separate switch units, three of which have a common pole and an associated high speed contact and low speed contact. The common poles of the first three switches are connected directly to the incoming power phase lines and the common poles of the fourth and fifth switches are connected to each other and to the terminal ends of the second winding for one phase. The high speed contacts of the associated first three switches are connected directly to the terminal ends of the second winding. The corresponding high speed contacts of the fourth and fifth switches are connected to the terminal ends of the first windings for the two phases from that connected to the common poles of the fourth and fifth switch units. The first three switch units have alternate or low speed contacts connected respectively directly to the three input terminals of the first winding. The fourth and fifth switch units of the speed switch are open in the alternate or low speed switch position.

In a preferred construction, each section of the second winding include one coil having one or more turns and spanning slightly less than 180°. The sections are located in diametrically opposite location with the coil sides located in immediately adjacent slots. The two sections of the first winding are concentrically wound respectively one each in alignment with the two coils sections of the first winding with the coil turns spaced inwardly by at least one slot with respect to the end of the first section. The second and third phases are similarly wound with the coils offset from each other and from such first windings to define a 120° phase relationship between the three phases.

The present invention provides a three-phase motor which maybe started in either the high or low speed setting and which provides alternate speeds with a highly efficient winding disposition. The three-phase motor can be designed and adjusted with an optimum power ratio by selection of the appropriate winding slots to produce the optimum magnetic effect during each speed connection.

BRIEF DESCRIPTION OF THE DRAWING

The drawing furnished herewith illustrates a preferred construction of the present invention in which the above advantages and features are clearly disclosed as well as others which will be readily understood from the following description.

In the drawing:

FIG. 1 is a schematic circuit illustration of the three-phase motor stator winding and a high-low speed switch, in accordance with the teaching of the present invention;

FIG. 2 is a diagrammatic illustration of the winding for the three-phase stator winding shown in FIG. 1; and FIG. 3 is a developed view of the motor stator winding as shown in FIGS. 1 and 2.

DESCRIPTION OF ILLUSTRATED EMBODIMENT

Referring to the drawings and particularly to FIG. 1, a stator winding 30 of a three-phase motor is illustrated including three similar phase winding units 31, 32 and 33.

A rotor, now shown, is provided having an appropriate secondary winding coupled to the stator winding unit 30 in accordance with known motor construction.

Each of the phase winding units 31-33 includes a first multiple section winding 34 and a second multiple section winding 35. The windings 34 and 35 of each phase are similarly interconnected to each other and to a set of three-phase incoming power lines 36, 37 and 38 via a multiple pole, multiple throw switch unit 39. The switch unit 39 includes a high speed setting shown by the full line position in which both windings 34 and 35 are connected in circuit to the incoming power lines 36-38 and an alternate low speed setting, shown by the phantom line position, in which only the winding 34 is connected in circuit to the incoming power lines 36-38.

As diagrammatically illustrated in FIG. 1, the second winding 35 includes series connected winding sections 40 and 41 having an outer line terminal 42 connected to the switch unit 39. The opposite end of the series connected winding sections 40 and 41 are connected to the first winding 34.

The first winding 34 is formed with two sections 43 and 44 having a center or common connection 45 interconnected to the second end of the second winding 35. The winding 34 has one end, shown from winding 43, connected to a fixed common terminal or connection 46 with the corresponding windings 43' and 43" of the other two phase winding 32 and 33. The opposite end of winding 44 constitutes an input terminal 47 which is connected to the switch units 39 for interconnection to the same terminals 47' and 47" of the phase winding 32 and 33 for a high speed connection and alternately for direct connection to the incoming power lines 36-38 for establishing of the low speed winding connection.

The two windings 34 and 35 are particularly wound in a multiple slotted stator, one embodiment of which is diagrammatically illustrated in FIGS. 2 and 3. In the illustrated embodiment, a stator core having twenty-four slots is provided, with the slots identified by corresponding numbers in FIGS. 2 and 3. The slots containing a turn of any given coil are illustrated in FIG. 2 by a small circle and by conventional line illustrations in FIG. 3.

Referring again to the first phase winding assembly or unit 31, the first and second winding sections 40 and 41 of the second winding 35 are shown appropriately located to define a two pole winding. The first winding section 41 of the winding 35 is made up of one or more turns wound as a single coil, having coil sides in slots 1 and 12. The second winding section 40 of the second winding 35 includes a similar coil wound in slots 13 and 24. The sections 40 and 41 are connected in series by a lead 48, as shown more clearly in FIG. 3, such that the poles defined by the respective coils are of an alternate or opposite polarity as shown by the conventional polarity symbols — and +.

The input terminal 42 to the first section 40 of the second winding 35 is shown at slot 24, with the interconnection of the first of the two sections 40 and 41 of the second winding 35 including the interconnecting line 48 between the slots 13 and 1. The opposite end of the series connected second winding 35 appears as a common connection 45 at slot 12 and to winding sections 43 and 44 of the first winding 34 at slots 2 and 20.

The first winding 34 is shown with the winding section 43 and 44 located concentrically within the coil sections 40 and 41 of the second winding 35. The coil section 44 includes a plurality of concentric coils 49, shown as four coils, which are wound in the separate parallel slots within the coil or winding section 41. Thus the first section 44 of the first winding 34 includes a first coil 49 located or wound in slots 2 and 11, a second coil 49' wound in slots 3 and 10, a third coil 49" wound in slots 4 and 9 and a fourth coil 49''' wound in slots 5 and 8. The coils 49 are connected in series to form a corresponding magnetic pole which is concentric of the first section 41 of winding 35. The second section 43 of the first winding 34 is similarly wound with multiple coils 50 in the diametrically opposite side of the stator and concentrically within the second section 40 of the second winding 35. In particular, section 43 includes four coils 50 wound with opposite sides located respectively in the pairs of slots 14-23, 15-22, 16-21 and 17-20. The section has the one end, shown as the coils side in slot 14, connected to the common fixed terminal or connection 46, as by the lead 51, and the section 43 has the opposite end, shown at slot 8, connected to terminal 47, which in turn is connected to switch unit 39.

Referring again to FIG. 1, the power switch unit 39 includes five power switches 52, 53, 54, 55 and 56, each of which is generally a similarly constructed single pole switch and reference is made to switch 52 for descriptive reference. The elements of switches 53-56 are identified by similar numbers, distinguished by suitable reference primes. The power switch 52 is a single-pole, double-throw switch having a common pole 57 connected to the incoming power line 36. The common pole 57 selectively engages a high speed contact 58 and a low speed contact 59. The high speed contact 58 is connected by a lead 60 to the power line terminal 42 of the second winding 35. The low speed contact 59 is connected by lead 61 to the line terminal 47 of the first winding, and to the corresponding terminals 47" of the third phase winding assembly 33 by the fourth switch units 55. The second phase switch 53 similarly connects the second phase power line 37 via a high speed contact 58' and a lead 62 to the power line terminal 42" of the second winding 35" of the phase 33. The low speed contact 59' of the second power switch 53 is connected by lead 63 to the first winding power terminal 47" of the phase winding unit 33. The fifth switch 56 also connects the line 63 to the terminal 47" of the third phase winding unit 33. The third switch 54 similarly connects the third phase winding unit 44' in the circuit and to the third phase power line 38 via the connecting lines 64 and 65.

The fourth and fifth switches 55 and 56 including the high speed contacts 58''' and 58'''' connected to lines 61 and 63 to terminals 47 and 47' and the common poles 57''' and 57'''' connected to the lines 65, which in turn is connected to terminal 47". The fourth and fifth switches 55 and 56 are open in the low speed position.

In summary, in the high speed position of switch unit 39, as shown in full line illustration, the three-phase power lines 36, 37 and 38 are connected by switches 52, 53 and 54 to the input terminals 42, 42' and 42" of the second winding 35. The first sections 43, 43' and 43" of the first winding 34 are connected in common at point 46 and the second sections 44, 44' and 44" are similarly connected in common through the switches 55 and 56 which interconnect the terminals 47, 47' and 47". Current flow in the several phases assuming phase line 38 at a maximum positive is as follows, with reference to the first phase unit 31; the current flows through winding sections 41 and 40, generating opposite poles on opposite sides of the stator and thus a common directed flux through the rotor, not shown. The current divides at terminal 45 through the two sections 43 and 44 of the first winding 34. The current in section 43 is from the innermost coil 50 and in the same direction as in winding section 41. The current in section 44 is from the outermost coil and in the same direction as winding section 40. Thus, the winding 34 and 35 define a two pole stator for high speed motor operation.

In an alternate phantom line switch position line 36 is connected by switch 52 to terminal 47 of the first winding 34 and the second winding 35 is open-circuited at the terminal 58. Similarly lines 37 and 38 are connected to terminals 47' and 47" and the second windings 35' and 35" are open circuited at the terminals 58' and 58". The fourth and fifth switches 55 and 56 are open to open the high speed interconnection of terminals 47, 47' and 47". Only the first windings 34, 34' and 34" are therefore connected in circuit to the power lines 36, 37 and 38. Current flow, under instantaneous polarities previously used, is from line 36 to terminal 47 and through section 44 to the common connection 45, from the innermost coil and thus in an opposite direction from the high speed direction. From section 44, and connection 45 current flow is through the section 43 from the innermost coil to the fixed common star connection 46 and thus in the same direction as in the high speed connection. The oppositely located coils of section 43 and 44 thus establish oppositely directional poles and develop a four pole motor operation. The second and third phase units 32 and 33 are similarly connected and generate similar currents and poles. The motor thus operates as a three phase, four pole motor with the speed reduced by essentially one half.

In operation, the switch is placed in either the high speed or low speed position, and upon supplying of power to lines 36, 37 and 38 the motor will operate with the above described current flows.

Various modes of carrying out the invention are contemplated as being within the scope of the following claims, particularly pointing out and distinctly claiming the subject matter which is regarded as the invention.

I claim:

1. A three-phase motor having a plurality of preselected operating speeds, said motor having three-phase winding assemblies displaced by one-hundred and twenty degrees and a switch unit connecting three-phase input means to said winding assemblies, each of said three-phase winding assemblies comprising a first multiple section winding having a first winding section connected in series with a second winding section, said winding sections being offset to define a pair of poles, said first winding sections of said three-phase winding assemblies having the first ends connected in common, said second winding sections of said three-phase winding assemblies having the second ends connected to said switch unit, a second multiple section winding having a first winding section and a second winding section, said winding sections of said second winding being offset to define a pair of poles and connected to form poles of opposite polarity; the first end of said second winding connected to the common connection between the first and second winding sections of the first winding and the second end connected to said switch unit, said switch unit including a plurality of switches having one speed position selectively and directly connecting the three-phase input means to the second ends of the second windings and the second ends of the first windings to each other to provide a substantially unmodulated equal magnitude poles of a first predetermined number and a second speed position connecting said second ends of said first winding directly to the three-phase input means and open circuiting the connection to the second windings to provide a substantially unmodulated equal magnitude poles of a second predetermined number different than said first predetermined number.

2. The three-phase motor of claim 1 wherein the first and second sections of said second winding are wound with coil sides spaced by essentially one-hundred and eighty degrees, and the first and second sections of the first winding each include a plurality of series connected coils concentrically wound within the respective first and second sections of said first winding.

3. The three-phase motor of claim 1 wherein said switch unit includes five switches having a common operator, the first, second and third of said switches being double pole, double throw switches having a high speed contact connected to the second end of the second winding and a low speed contact connected to the second end of the first winding, the fourth of said switches connected to the second ends of the second winding of a first and second of said winding assemblies, and the fifth of said switches connected to the second ends of the second winding of the first and a third of said winding assemblies.

4. A three-phase motor having a plurality of preselected operating speeds, comprising three-phase winding assemblies, each of said winding assemblies comprising a first and second multiple sectioned windings having a first winding section connected in series with a second winding section, a switch unit having three-phase input line connection means, said winding sections of each winding being correspondingly offset and concentrically wound to define pairs of poles, said assemblies having one end of the first windings connected in common and the second ends connected to said switch unit, said second winding having one end connected to a common connection between first and second winding sections of the first winding and the second end connected to said switch unit, said switch unit having one speed position selectively and directly connecting the three-phase input line connection means to the second ends of the second winding and the second ends of the first winding to each other to provide unmodulated substantially equal magnitude poles of a first predetermined number and a second speed position connecting said second ends of said first winding directly to the three-phase input means and open circuiting the connection to the second winding to provide unmodulated substantially equal magnitude poles of a second predetermined number different than said first predetermined number.

5. The three-phase motor of claim 1 wherein the first and second sections of said second winding are wound including a coil with coil sides spaced by essentially one-hundred and eighty degrees, and the first and second sections of the first winding being concentrically wound within the respective first and second sections of said first winding.

6. The three-phase motor of claim 1 wherein said switch unit includes a low speed connection and a high speed connection and includes five switch sections, three sections having high speed contacts connected to the second end of the second winding and low speed contacts connected to the second end of the first winding, the fourth section having only a high speed contact connected to the second ends of the second winding to form a common connection in the high speed position.

* * * * *